United States Patent [19]

Ohgoda et al.

[11] Patent Number: 4,855,598
[45] Date of Patent: Aug. 8, 1989

[54] ENERGY SUBTRACTION PROCESSING METHOD FOR RADIATION IMAGES, STIMULABLE PHOSPHOR SHEET, STIMULABLE PHOSPHOR SHEET COMPOSITE MEMBER & STIMULABLE PHOSPHOR SHEET FILTER COMPOSITE MEMBER USED FOR THE METHOD

[75] Inventors: Makoto Ohgoda; Nobuyoshi Nakajima, both of Kanagawa, Japan

[73] Assignee: Fuji Photo Film Co., Ltd., Kanagawa, Japan

[21] Appl. No.: 119,265

[22] Filed: Nov. 9, 1987

Related U.S. Application Data

[63] Continuation of Ser. No. 883,429, Jul. 14, 1986, which is a continuation of Ser. No. 548,486, Nov. 3, 1983, abandoned.

[30] Foreign Application Priority Data

Nov. 4, 1982 [JP] Japan ................................ 57-193765

[51] Int. Cl.$^4$ ............................................. G03C 5/16
[52] U.S. Cl. .............................. 250/327.2; 250/484.1; 378/174; 364/413.23
[58] Field of Search .................. 250/327.2, 484.1; 364/414, 413.13, 413.23; 378/174, 156, 157

[56] References Cited

U.S. PATENT DOCUMENTS

| | | | |
|---|---|---|---|
| 2,541,599 | 2/1951 | Morrison | 378/156 |
| 3,567,934 | 3/1971 | Clarke | 378/156 |
| 4,082,957 | 4/1978 | Morlan | 378/156 |
| 4,189,645 | 2/1980 | Chaney et al. | 378/157 |
| 4,355,331 | 10/1982 | Georges et al. | 378/99 |
| 4,356,398 | 10/1982 | Komaki et al. | 250/327.2 |
| 4,542,459 | 9/1985 | Riederer | 378/5 |
| 4,564,861 | 1/1986 | Hishinuma et al. | 358/111 |
| 4,578,803 | 3/1986 | Macooaki | 378/62 |
| 4,581,535 | 4/1986 | Komaki et al. | 250/327.2 |
| 4,590,517 | 5/1986 | Kato et al. | 358/111 |
| 4,710,875 | 12/1987 | Nakajima | 364/413.23 |

FOREIGN PATENT DOCUMENTS 0081227  6/1983  European Pat. Off. ............. 378/62

Primary Examiner—Janice A. Howell
Assistant Examiner—Richard Hanig
Attorney, Agent, or Firm—Sughrue, Mion, Zinn, Macpeak & Seas

[57] ABSTRACT

An an X-ray detecting means in an energy subtraction processing method, there is used a composite member comprising a plurality of stimulable phosphor sheets exhibiting different levels of characteristics of absorbing the low energy component of a radiation and overlaid one upon another, or a composite member comprising a plurality of stimulable phosphor sheets and at least one filter made of a material absorbing the low energy component of a radiation which are overlaid one upon another, or a stimulable phosphor sheet comprising a substrate made of a material absorbing the low energy component of a radiation and stimulable phosphor layers provided thereon. The composite member or the stimulable phosphor sheet is exposed to a radiation passing through an object including a specific structure to record therein at least two radiation images between which the image information at the portion of the specific structure is different. On the basis of the radiation images read out from the composite member or the stimulable phosphor sheet, a subtraction image is obtained.

23 Claims, 4 Drawing Sheets

ENERGY SUBTRACTION PROCESSING METHOD FOR RADIATION IMAGES, STIMULABLE PHOSPHOR SHEET, STIMULABLE PHOSPHOR SHEET COMPOSITE MEMBER & STIMULABLE PHOSPHOR SHEET FILTER COMPOSITE MEMBER USED FOR THE METHOD

This is a continuation of application Ser. No. 883,429, filed 7/14/86, which is a continuation of application Ser. No. 548,486 filed 11/3/83, now abandoned.

BACKGROUND OF THE INVENTION

1. Field of the Invention

This invention relates to an energy subtraction processing method for radiation images, and a stimulable phosphor sheet, a stimulable phosphor sheet composite member, and a stimulable phosphor sheet-filter composite member which are used for the energy subtraction processing method. This invention particularly relates to an energy subtraction processing method, and a stimulable phosphor sheet, a stimulable phosphor sheet composite member, and a stimulable phosphor sheet-filter composite member used for the energy subtraction processing method in a radiation image recording and reproducing system wherein a stimulable phosphor sheet is once exposed to a radiation passing through an object to have a radiation image stored therein, the stimulable phosphor sheet is scanned with stimulating rays which cause it to emit light in proportion to the radiation energy stored, the emitted light is photoelectrically detected and converted to an electric image signal, and a visible image is reproduced by use of the obtained electric signal.

2. Description of the Prior Art

As one type of digital subtraction processing method or digital radiography (hereinafter referred to as "DR"), there has heretofore been known the energy subtraction processing method. In the energy subtraction processing method, an object is exposed to X-rays having energy distributions different from each other to obtain two X-ray images respectively containing the images of a specific structure (for example, an organ, bone, blood vessel, or the like) of the object recorded on the basis of the intrinsic X-ray energy absorption characteristics of the specific structure. Then, each X-ray image is weighted appropriately, and subjected to subtraction to extract the image of the specific structure. As regards DR, there has heretofore been known digital fluoroscopy wherein the output of an X-ray fluoroscopic camera comprising an image intensifier tube (I.I tube) and a television camera is digitally processed, and scanning projection radiography utilizing the X-ray detecting system of computed tomography, such as a Xe detector system.

Specifically, the following types of energy subtraction processing method have heretofore been known:

(I) An object is intermittently exposed at short time intervals to X-rays having energy distributions different from each other. In synchronization with the exposures, the X-rays passing through the object are detected by an X-ray fluoroscopic camera comprising an I.I tube and a television camera or by an X-ray detector such as a Xe detector. Then, a subtraction image is obtained from two or more X-ray images thus recorded. The exposures to the X-rays having energy distributions different from each other are effected by (i) modifying the X-ray source so that it can emit X-rays having such energy distributions different from each other, by (ii) closely positioning two or more X-ray sources emitting X-rays having energy distributions different from each other so that the X-rays emitted from the X-ray sources do not interfere with each other, or by (iii) selectively inserting and removing a filter for changing the energy distribution of X-rays into the space between the X-ray source and the object.

(II) Two X-ray sources capable of simultaneously emitting X-rays having energy distributions different from each other are positioned closely to each other. A filter made of an X-ray shielding material such as lead and provided with many fine slits or small holes (for example, small circular or square holes positioned in a checkered pattern) so that the area ratio of the X-ray shielding sections to the opening sections is 1:1 is inserted between the object and the X-ray sources in such a manner that the X-rays emitted from one X-ray source and the X-rays emitted from the other X-ray sources do not interfere with each other at the X-ray receiving face of the X-ray detector. In this condition, the object is simultaneously exposed to the X-rays emitted from the two X-ray sources, whereby X-ray images are formed on the X-ray receiving face of the X-ray detector by the X-rays having energy distributions different from each other. The X-ray images thus formed are detected by the X-ray detector, and discrimiated from each other when or after the X-ray images are read out. On the basis of the images thus discriminated, a subtraction image is obtained.

(III) An object is moved with respect to an X-ray source and an X-ray detector, and X-rays having energy distributions different from each other are alternately emitted at predetermined time intervals in a fan-like pattern. The X-rays passing through the object are detected by the X-ray detector positioned at the rear of the object. By use of the image signals thus obtained from the X-ray detector, X-ray images corresponding to the X-rays having energy distributions different from each other are obtained. Then, a subtraction image is obtained on the basis of the X-ray images. The X-rays having energy distributions different from each other may be generated in the same manner as described in (I).

(IV) A filter having the same construction as the filter used in the aforesaid method (II) is made of a metal absorbing the low energy component of X-rays, such as copper. The filter is inserted between an X-ray source and an object, and X-rays having energy distributions different from each other are generated from the X-ray source in such a manner that the X-rays do not interfere with each other at the X-ray receiving face of an X-ray detector. X-ray images are formed on the X-ray receiving face of the X-ray detector by the X-rays having energy distributions different from each other. The X-ray images thus formed are detected by the X-ray detector, and discriminated from each other when or after the X-ray images are read out. On the basis of the images thus discriminated, a subtraction image is obtained.

In the energy subtraction processing method, it is possible to discriminate and extract an image of a specific structure having X-ray energy absorption characteristics different from the characteristics of the other structures of an object, and to eliminate an image of the bone and form an image of only a soft tissue of the human body. For example, it is possible to discriminate and extract an image of a structure such as the bronchus existing at the mediastinal septum, which is superposed on the image of the bone and cannot easily be diagnosed in the conventional method, from the image of the bone. Further, when the so-called temporal (time difference) subtraction processing method is carried out in the recording of a contrasted image of the abdomen, a problem is presented by an artifact of the gas at the abdomen. However, in the energy subtraction processing method, it is possible to eliminate the information on the soft tissue and to form only an image of the bone and a contrasted image free from an artifact of the gas at the abdomen. Accordingly, the energy subtraction processing method can provide information useful for diagnosis which cannot be obtained by the conventional method, and is basically advantageous for medical diagnosis.

However, the aforesaid conventional energy subtraction processing method has drawbacks intrinsic to DR. Namely, the spatial resolution of the subtraction image obtained by use of the DR generally depends on the resolution of the X-ray fluoroscopic camera comprising an I.I. tube and a television camera, or the resolution of the X-ray detector such as a Xe detector. However, since the resolution of the X-ray fluoroscopic camera or the X-ray detector used in conventional DR is not so high, the conventional energy subtraction processing method presents the problem that it is impossible to diagnose a specific structure with sufficient accuracy. Further, since the recording range in DR is limited by the X-ray receiving area of the X-ray detector, the conventional energy subtraction processing method presents another problem in that it is impossible to obtain a subtraction image of a wide area of the human body at one time.

Furthermore, the aforesaid conventional energy subtraction processing methods (I), (II), (III) and (IV) have the drawbacks as described below.

1. A special X-ray source is needed. [Methods (I) and (II)].

2. A shift is generated between the corresponding picture elements of two X-ray images. [Methods (I), (II), (III) and (IV) wherein two X-ray sources are used].

3. The resolution obtained is half the resolution in the ordinary X-ray image forming method. [Methods (II) and (IV)].

4. Since the X-ray images obtained by use of the X-rays having energy distributions different from each other are formed on the same plane, it is not always possible to discriminate the X-ray images from each other when or after the X-ray images are read out. [Methods (II) and (IV)].

5. Since an object is intermittently exposed to the X-rays having energy distributions different from each other, a shift is generated between the images due to muscular motion, respiratory motion, vermicular motion, or the like, of the object. As a result, it becomes impossible to obtain a subtraction image of a high quality. [Method (I)].

6. Since an object is scanned with the X-rays emitted in a fan-like pattern, a relatively long time is required to form one image, and a time difference is generated between the beginning and the end of the scanning. Therefore, a shift is generated between the images due to muscular motion, respiratory motion, vermicular motion, or the like, of the object. As a result, it becomes impossible to obtain a subtraction image of a high quality. In particular this problem makes extraction of an angiogram all but impossible. [Method (III)].

SUMMARY OF THE INVENTION

Accordingly, the primary object of the present invention is to provide an energy subtraction processing method for a radiation image, which eliminates the drawbacks of the conventional energy subtraction processing method and provides a subtraction image of a high quality.

Another object of the present invention is to provide a novel X-ray detecting means for use in the energy subtraction processing method in accordance with the present invention.

When certain kinds of phosphors are exposed to a radiation such as X-rays, $\alpha$-rays, $\beta$-rays, $\gamma$-rays or ultraviolet rays, they store a part of the energy of the radiation. Then, when the phosphor which has been exposed to the radiation is exposed to stimulating rays such as visible light, light is emitted from the phosphor in proportion to the stored energy of the radiation. A phosphor exhibiting such properties is referred to as a stimulable phosphor.

As disclosed in U.S. Pat. No. 4,258,264 and Japanese Unexamined Patent Publication No. 56(1981)-11395, it has been proposed to use a stimulable phosphor in a radiation image recording and reproducing system. Specifically, a stimulable phosphor sheet is first exposed to a radiation passing through an object to have a radiation image stored therein, and is then scanned with stimulating rays such as a laser beam which cause it to emit light in proportion to the radiation energy stored. The light emitted from the stimulable phosphor sheet upon stimulation thereof is photoelectrically detected and converted to an electric image signal, which is processed as desired to reproduce a visible image on a recording material such as a photographic light-sensitive material or on a display device such as a cathode ray tube (CRT). By "stimulable phosphor sheet" is meant a sheet provided with a stimulable phosphor layer for storing a radiation image therein. In general, the stimulable phosphor layer comprises an appropriate binder and a stimulable phosphor dispersed therein. When the stimulable phosphor layer is self-supporting, the stimulable phosphor layer can by itself form the stimulable phosphor sheet. In general, however, the stimulable phosphor layer is provided on an appropriate substrate to form the stimulable phosphor sheet. Normally, a protective film for physically and chemically protecting the stimulate phosphor layer is provided on the surface of the stimulable phosphor layer on the side opposite to the substrate.

This radiation image recording and reproducing system using a stimulable phosphor sheet is advantageous over conventional radiography using a silver halide photographic material in that the image can be recorded over a very wide range (latitude) of radiation exposure and further in that the electric image signal used for reproducing the visible image can be processed as desired to improve the image quality for viewing, particularly for diagnostic purposes. In more detail, since the amount of light emitted upon stimulation after the radiation energy is stored in the stimulable phosphor varies over a very wide range in proportion to the amount of energy stored therein, it is possible to obtain an image having desirable density regardless of the amount of exposure of the stimulable phosphor to the radiation by reading out the emitted light with an appropriate readout gain and converting it to an electric image signal to reproduce a visible image on a recording material or a display device. The electric image signal may further be processed as desired to obtain a radiation image suitable for viewing, particularly for diagnostic purposes. This is very advantageous in practical use.

As mentioned above, in the radiation image recording and reproducing system using a stimulable phosphor sheet, deviation of the level of the radiation energy stored in the stimulable phosphor sheet from a desired level can easily be compensated by setting the read-out gain to an appropriate value when photoelectrically reading out the light emitted from the stimulable phosphor sheet upon stimulation thereof. Therefore, the quality of the reproduced radiation image is noyt adversely affected by a fluctuation in radiation dose due to fluctuating tube voltage or MAS value of the radiation source, a variation in the sensitivity of the stimulable phosphor sheet or the photodetector, a change in radiation dose according to the condition of the object, or a fluctuation in the radiation transmittance according to the object, or the like. Also, it is possible to obtain a desirable radiation image even when the radiation dose to the object is low. Further, it is possible to obtain a radiation image having high image quality of high contrast, high sharpness and low noise, or the like, by converting the light emitted from the stimulable phosphor sheet into an electric image signal, and processing the electric image signal as desired. Particularly, when the radiation image is used for medical diagnosis, it is possible to obtain a radiation image processed in the manner most suitable for a particular portion of a human body such as the heart, the chest, or the like, thereby realizing an improvement in diagnostic efficiency and accuracy.

The energy subtraction processing method for radiation images in accordance with the present invention utilizes the aforesaid radiation image recording and reproducing system using a stimulable phosphor sheet. Namely, in the energy subtraction processing method for radiation images in accordance with the present invention, instead of the X-ray detector used in the conventional energy subtraction processing method, a stimulable phosphor sheet composite member comprising a plurality of stimulable phosphor sheets overlaid one upon another, or a stimulable phosphor sheet-filter composite member comprising a plurality of stimulable phosphor sheets and at least one filter made of a material absorbing the low energy component of a radiation which are positioned in the condition overlaid one upon another, or a stimulable phosphor sheet having a specific construction is used as the X-ray detecting means. The composite member or the stimulable phosphor sheet having a specific construction is exposed to a radiation passing through an object including a specific structure exhibiting radiation energy absorption characteristics different from the characteristics of the other structures. In this manner, at least two radiation images between which the image information at the portion corresponding to the aforesaid specific structure is different are recorded in the composite member or the stimulable phosphor sheet. On the basis of the radiation images read out from the composite member or the stimulate phosphor sheet, a subtraction image is obtained. The method in accordance with the present invention eliminates the problems presented by the conventional energy subtraction processing method.

Namely, the energy subtraction processing method for radiation images in accordance with a first aspect of the present invention comprises the steps of:

(i) exposing an object including a specific structure exhibiting radiation energy absorption characteristics different from the radiation energy absorption characteristics of the other structures to a radiation, (ii) simultaneously exposing a plurality of stimulable phosphor sheets positioned in the condition overlaid one upon another in a composite member to the radiation passing through said object to have radiation images stored in the respective stimulable phosphor sheets so that image information containing, at the portion corresponding to said specific structure, the low energy component of the radiation in an amount smaller than the amount contained in the image information recorded in a stimulable phosphor sheet positioned closer to said object is recorded in a stimulable phosphor sheet positioned farther from said object, (iii) scanning the respective stimulable phosphor sheets with stimulating rays to sequentially release the radiation energy stored in the stimulable phosphor sheets as light emission, (iv) photoelectrically detecting the emitted light and converting to it digital image signals of the respective radiation images, (v) on the basis of said radiation images converted to said digital image signals, obtaining at least two radiation images to be subtraction processed, and (vi) extracting an image of said specific structure by conducting a subtraction processing of said digital image signals between the corresponding picture elements of said at least two radiation images to be subtraction processed.

In a second aspect, the present invention provides an energy subtraction processing method for radiation images comprising the steps of:

(i) exposing an object including a specific structure exhibiting radiation energy absorption characteristics different from the radiation energy absorption characteristics of the other structures to a radiation, (ii) exposing a stimulable phosphor sheet-filter composite member comprising:
  (a) a plurality of stimulable phosphor sheets positioned in the condition overlaid one upon another, and
  (b) a filter made of a meterial absorbing the low energy component of the radiation and interposed in at least one position between the respective stimulable phosphor sheets among a plurality of said stimulable phosphor sheets, to the radiation passing through said object to have radiation images stored in the respective stimulable phosphor sheets so that image information containing, at the portion corresponding to said specific structure, the low energy component of the radiation in an amount smaller than the amount contained in the image information recorded in a stimulable phosphor sheet positioned on the object side with respect to the position in which said filter is interposed is recorded in a stimulable phosphor sheet positioned on the side opposite to said object with respect to the position in which said filter is interposed, (iii) scanning the respective stimulable phosphor sheets with stimulating rays to sequentially release the radiation energy stored in the stimulable phosphor sheets as light emission, (iv) photoelectrically detecting the emitted light and converting it to digital image signals of the respective radiation images, (v) on the basis of the radiation image converted to said digital image signal which is obtained from a stimulable phosphor sheet positioned in each block of said stimulable phosphor sheet-filter composite member divided into blocks in a number equal to the number of the positions in which said filter is interposed plus one with respect to the position in which said filter is interposed, obtaining one radiation image to be subtraction processed from each of said blocks, thereby obtaining the radiation images to be subtraction processed in a total number equal to the number of the positions in which said filter is interposed plus one, and (vi) extracting an image of said specific structure by conducting a subtraction processing of said digital image signals between the corresponding picture elements of said radiation images to be subtraction processed.

Further, in a third aspect, the present invention provides an energy subtraction processing method for radiation images comprising the steps of:

(i) exposing an object including a specific structure exhibiting radiation energy absorption characteristics different from the radiation energy absorption characteristics of the other structures to a radiation, (ii) exposing a stimulable phosphor sheet comprising:
  (a) a substrate made of a material absorbing the low energy component of the radiation, and
  (b) stimulable phosphor layers formed on both surfaces of said substrate,
to the radiation passing through said object to have radiation images stored in the respective stimulable phosphor layers so that image information containing, at the portion corresponding to said specific structure, the low energy component of the radiation in an amount smaller than the amount contained in the image information recorded in the stimulable phosphor layer formed on the object side surface of said substrate of said stimulable phosphor sheet is recorded in the stimulable phosphor layer formed on the substrate surface opposite to said object.

(iii) scanning the respective stimulable phosphor layers with stimulating rays to sequentially release the radiation energy stored in the stimulable phosphor layers as light emission, (iv) photoelectrically detecting the emitted light and converting it to digital image signals of the respective radiation images, and (v) extracting an image of said specific structure by conducting a subtraction processing of said digital image signals between the corresponding picture elements of the two radiation images converted to said digital image signals.

In the energy subtraction processing methods in accordance with the first aspect and the second aspect of the present invention, the stimulable phosphor sheet composite member and the stimulable phosphor sheet-filter composite member should preferably comprise two or three stimulable phosphor sheets. When the composite member comprises two stimulable phosphor sheets, two radiation images obtained from these stimulable phosphor sheets are directly used as the images to be subtraction processed. Further, in the energy subtraction processing methods in accordance with the first, second and third aspects of the present invention, by "conducting a subtraction processing of the digital image signals between the corresponding picture elements of the radiation images" is meant that the digital image signals of the corresponding picture elements are multiplied by appropriate weight factors and then subjects to the subtraction to obtain a new image signal. Further, by "a material absorbing the low energy component of the radiation" is meant a material absorbing the low energy component of the radiation to a larger extent than the high energy component of the radiation.

In the energy subtraction processing method in accordance with the present invention, a subtraction image having markedly higher spatial resolution than that of conventional DR can be obtained since it is possible to increase the number of picture elements per unit area by decreasing the beam diameter of the stimulating rays (laser beam) employed for scanning the stimulable phosphor sheet at the image read-out step, and to directly record the final output of the image data obtained by the subtraction processing and various image processing on a light-sensitive material such as silver halide photographic material. Therefore, theoretically, it is possible to obtain a sharp subtraction image having a spatial resolution higher than the visual resolution of human eyes. Further, since there is no technical obstruction to making and using larger stimulable phosphor sheets, it is possible to obtain at one time a subtraction image over a large area of the human body. Thus, the energy subtraction processing method in accordance with the present invention eliminates the intrinsic problems presented by the X-ray detector in conventional DR.

Further, in the energy subtraction processing method in accordance with the present invention, since the stimulable phosphor sheets of the composite member of the stimulable phosphor layers of the stimulable phosphor sheet provided therewith on both surfaces are simultaneously exposed to the radiation emitted from a radiation source and passed through an object, no time difference is generated in the formation of at least two radiation images to a subtraction processed. Accordingly, even when the condition of a specific structure of a human body changes from moment to moment, it is still possible to obtain a subtraction image of the specific structure having a high image quality. Furthermore, in the present invention, since it is possible to use a single radiation source, no deviation in position is generated between the corresponding picture elements of at least two radiation images. Also, in the present invention, it is possible to directly use the conventional general-purpose X-ray generator and image recording apparatus. Further, in the present invention, since radiation images obtained by use of radiation beams having energy distributions different from each other are recorded in separate stimulable phosphor sheets or separate stimulable phosphor layers, there is not presented the problem that the images must be discriminated from each other when or after the images are read out, and there is no risk of the resolution decreasing at the step of obtaining a subtraction image. As described above, the energy subtraction processing method in accordance with the present invention eliminates all the problems presented by the conventional energy subtraction processing method. Also, when the energy subtraction processing method in accordance with the present invention is carried out, it is possible to use the cassette employed in ordinary radiography as the means for housing the stimulable phosphor sheet composite member, the stimulable phosphor sheet-filter composite member or the stimulable phosphor sheet provided with two stimulable phosphor layers at the image recording step. Thus, the present invention is advantageous also in that the cassette used in ordinary radiography can be employed as such. Further, in the energy subtraction processing method of the present invention, though the radiation energy is stored in the stimulable phosphor sheets in such a manner that the intensity of the radiation energy stored becomes lower in a stimulable phosphor sheet positioned farther from the object when a plurality of stimulable phosphor sheets are used for image recording in the condition overlaid one upon another, it is possible to obtain image signals having the same range of intensity from all of the stimulable phosphor sheets.

DETAILED DESCRIPTION OF THE INVENTION

The present invention will hereinbelow be described in further detail.

In the energy subtraction processing method for radiation images in accordance with the present invention, in order to conduct recording of radiation images so that two or more radiation images to be subtraction processed which involve a difference in the image information due to a difference in the degree of absorption of the low energy component of a radiation at the portion corresponding to a specific structure of an object, the stimulable phosphor sheet composite member, the stimulable phosphor sheet-filter composite member, or the stimulable phosphor sheet provided with two stimulable phosphor layers are composed as described below. Namely, in the energy subtraction processing method for radiation images in accordance with the first aspect of the present invention, the stimulable phosphor sheet composite member is composed, for example, as described in (i), (ii) or (iii), and used for carrying out the recording of radiation images as described above:

(i) A stimulable phosphor exhibiting a higher level of characteristics of absorbing the low energy component of a radiation is used as the stimulable phosphor of a stimulable phosphor sheet positioned closer to the object, or a material absorbing the low energy component of a radiation is dispersed in the stimulable phosphor layer of a stimulable phosphor sheet positioned closer to the object, so that the low energy component of the radiation passing through the object is absorbed to a larger extent in the stimulable phosphor layer of the stimulable phosphor sheet positioned closer to the object.

(ii) A substrate made of a material absorbing the low energy component of a radiation is used as the substrate of a stimulable phosphor sheet positioned closer to the object, so that the low energy component of the radiation passing through the object is absorbed to a larger extent in the substrate of the stimulable phosphor sheet positioned closer to the object. In this case, the substrate made of a material absorbing the lower energy component of a radiation may be composed only of the material absorbing the low energy component of a radiation, or may be composed of the material absorbing the low energy component of a radiation and another material for containing said material in the form dispersed therein.

(iii) A combination of the composition (i) with the composition (ii) described above.

Further, in the energy subtraction processing method for radiation images in accordance with the second aspect of the present invention, recording of radiation images as described above is carried out by interposing a filter made of a material absorbing the low energy component of a radiation in at least one position between the respective stimulable phosphor sheets of the stimulable phosphor sheet composite member, thereby having the low energy component of the radiation passing through the object absorbed by the filter. Also in this case, the filter made of a material absorbing the low energy component of a radiation may be composed only of the material absorbing the low energy component of a radiation, or may be composed of the material absorbing the low energy comonent of a radiation and another material for containing said material in the form dispersed therein.

In the energy subtraction processing method for radiation images in accordance with the third aspect of the present invention, recording of radiation images as described above is carried out by using a stimulable phosphor sheet comprising a substrate made of a material absorbing the low energy component of a radiation and two stimulable phosphor layers formed on opposite surfaces of the substrate, and by having the low energy component of the radiation passing through the object absorbed by the substrate. Also in this case, the substrate made of a material absorbing the low energy component of a radiation may be composed only of the material absorbing the low energy component of a radiation, or may be composed of the material absorbing the low energy component of a radiation and another material for containing said material in the form dispersed therein.

In the energy subtraction processing method for radiation images in accordance with the second aspect of the present invention, since the absorption of the low energy component of the radiation passing through the object is effected by the filter positioned separately from the stimulable phosphor sheets, it is possible to efficiently conduct the absorption of the low energy component of the radiation, and to use stimulable phosphor sheets employed for recording of plain images directly as the stimulable phosphor sheets for the method. From these viewpoints, the method in accordance with the second aspect of the present invention is advantageous over the method according to the first and third aspects of the present invention.

As described above, by "a material absorbing the low energy component of the radiation" is meant a material absorbing the low energy component of the radiation to a larger extent than the high energy component of the radiation. The material may, for example, be a metal and should preferably be at least one of Cu, W, Mo, Ni, Pb, Au, Ag, Ba, Ta, Fe, Al, Zn, Cd, Ti, Zr, V, Nb, Cr, Co, and Sn.

In the energy subtraction processing method for radiation images in accordance with the present invention, a subtraction processing is conducted between the corresponding picture elements of the radiation images to be subtraction processed in order to obtain a subtraction image. As described above, by "conducting a subtraction processing" is meant that the digital image signals of the corresponding picture elements of the radiation images to be subtraction processed are multipled by appropriate weight factors and then subjected to the subtraction to obtain a new image signal. For example, when the number of the images to be subtraction processed is two, the subtraction processing is represented by the formula of $$L = mP - nQ$$

wherein P and Q designate the digital image signals of the radiation images to be subtraction processed, m and n designate the weight factors, and L denotes the new image signal obtained by the subtraction processing. When the subtraction image is obtained, in order to erase the image information other than the image information on the specific structure to be extracted, the intensity distributions of the image signals at the portion to be erased should be made identical with each other between the images to be subtraction processed. For this purpose, it is advantageous to make the gradations of the image identical with each other at the portion to be erased. In order to realize this, the subtraction should preferably be carried out by selecting the weight factors m and n so that the image gradiations at the portion to be erased become identical with each other. Depending on the image recording condition, it will sometimes happen that $m=n$ or $m=n=1$. Further, since various structures of the object are superposed in a complicated manner and recorded as integrated images in the images to be subtraction processed, the foresaid weight factors are not necessarily constants. In some cases, the weight factors become a function of the thickness of the structure and exhibit non-linearity.

Specifically, as a method of conducting the aforesaid subtraction processing, the weight factors may be selected so that the intensity distributes in the region of the structure to be erased (for example, the soft tissue such as the lungs in a frontal chest radiation image) are identical with each other, and the image signal of all picture elements of the respective images to be subtraction processed may be multiplied by the weight factors thus selected. In this method, the intensities of the regions containing only the soft tissue in the respective images to be subtraction processed become equal to each other. Therefore, when the subtraction is conducted between the images to be subtraction processed, the image information on the soft tissue is erased, and only the image information on the bone is extracted as the difference between the images. Accordingly, such a simple method should preferably be employed in practical use.

In the energy subtraction processing method for radiation images according to the first aspect and the second aspect of the present invention, when the number of stimulable phosphor sheets constituting the composite member is larger than the number of the obtained radiation images to be subtraction processed, for example when two radiation images to be subtraction processed are obtained by use of a composite member comprising three stimulable phosphor sheets, at least one of the radiation images to be subtraction processed is obtained from the radiation images obtained from two or more adjacent stimulable phosphor sheets. Particularly, in the energy subtraction processing method according to the second aspect of the present invention, a filter made of a material absorbing the low energy component of the radiation is interposed in at least one position between the respective stimulable phosphor sheets among a plurality of stimulable phosphor sheets constituting the composite member, and one radiation image to be subtraction processed is obtained from each block of the composite member divided into blocks in a number equal to the number of the positions in which the filter is interposed plus one with respect to the position in which said filter is interposed. When one of the blocks comprises two or more stimulable phosphor sheets, a single radiation image to be subtraction processed is obtained from the radiation images obtained from the two or more contiguous stimulable phosphor sheets. In order to obtain a single radiation image to be subtraction processed from the radiation images respectively obtained from a plurality of contiguous stimulable phosphor sheets, a superposition processing should preferably be used. Namely, among the radiation images respectively obtained from a plurality of contiguous stimulable phosphor sheets, the radiation image obtained from a stimulable phosphor sheet positioned farther from the object contains more noise than in the radiation image obtained from a stimulable phosphor sheet positioned closer to the object. In this case, when the image signals of the respective radiation images are multiplied by appropriate weight factors and when subjected to the superposition rocessing, it is possible to obtain a radiation image (i.e. a radiation image to be subtraction processed) exhibiting an S/N ratio improved over the S/N ratio of every unprocessed radiation image.

The energy subtraction processing method for radiation images in accordance with the first aspect of the present invention can be carried out by using a composite member comprising a plurality of ordinary stimulable phosphor sheets having the same specifications (i.e. stimulable phosphor sheets exhibiting the same level of characteristics of absorbing the low energy component of a radiation). However, in order to obtain larger subtraction processing effects, there should preferably be used a composite member comprising at least two stimulable phosphor sheets exhibiting different levels of characteristics of absorbing the low energy component of a radiation and positioned in such a manner that a stimulable phosphor sheet exhibiting a higher level of characteristics of absorbing the low energy component of a radiation is closer to the object than a stimulable phosphor sheet exhibiting a lower level of such characteristics. There should more preferably be used a composite member comprising two stimulable phosphor sheets exhibiting different levels of such characteristics positioned in the manner as described above. In order to change the characteristics of absorbing the low energy component of a radiation among the stimulable phosphor sheets of the composite member, the composite member may be composed as described above in (i), (ii) or (iii). In the case wherein the composite member comprises two stimulable phosphor sheets, two radiation images obtained from the stimulable phosphor sheets are directly used as the two radiation images to be subtraction processed.

In the energy subtraction processing method for radiation images in accordance with the second aspect of the present invention, a stimulable phosphor sheet-filter composite member as described below in (I), (II) or (III) should preferably be used:

(I) A composite member comprising two stimulable phosphor sheets and a filter interposed therebetween.

(II) A composite member comprising three stimulable phosphor sheets and a filter interposed between the stimulable phosphor sheet positioned closest to the object and the middle stimulable phosphor sheet.

(III) A composite member comprising three stimulable phosphor sheets and two filters, each filter being interposed between two adjacent stimulable phosphor sheets among the three stimulable phosphor sheets.

When the composite member (I) or (III) is used, the two or three radiation images obtained from the respective stimulable phosphor sheets are directly used as the two or three radiation images to be subtraction processed. When the composite member (II) is used, the radiation image obtained from the stimulable phosphor sheet positioned closest to the object is used as one radiation image to be subtraction processed, and a radiation image obtained, for example, by superposition processing from two radiation images obtained from the two remaining stimulable phosphor sheets is used as the other radiation image to be subtraction processed.

In the energy subtraction processing method for radiation images in accordance with the third aspect of the present invention, two radiation images obtained from the stimulable phosphor layers formed on opposite surfaces of the substrate made of a material absorbing the low energy component of a radiation are directly used as two radiation images to be subtraction processed. In this case, since the radiation images stored in the two stimulable phosphor layers of the substrate are in mirror image relation to each other, one or the other of these radiation images should be inverted when the subtraction processing is conducted. In the energy subtraction processing method for radiation images in accordance with the third aspect of the present invention, the subtraction processing effects can be further improved by adding and dispersing a material absorbing the low energy component of a radiation in the stimulable phosphor layer positioned on the object side of the substrate.

In the energy subtraction processing method for radiation images in accordance with the present invention, a radiation separated in advance into the high energy band and the low energy band by a filter should preferably be used as the radiation to which the object is exposed at the image recording step. This is because it becomes easier to discriminate the high energy component and the low energy component of the radiation from each other in the stimulable phosphor sheet composite member, or in the stimulable phosphor sheet-filter composite member, or in the stimulable phosphor sheet provided with two stimulable phosphor layers.

Further, in the energy subtraction processing method for radiation images in accordance with the present invention, in order to prevent a reduction in the amount of the radiation to which the stimulable phosphor sheet or the stimulable phosphor layer positioned farther from the object is exposed, it is advantageous that the thickness of the stimulable phosphor sheet or the stimulable phosphor layer positioned closer to the object be made smaller.

In the present invention, in order to improve the signal-to-noise ratio, it is preferable that the stimulable phosphor emits light having a wavelength range not overlapping upon the range of wavelength of the stimulating ray employed to excite the stimulable phosphor. Preferably, when a laser source which emits stimulating ray having a wavelength within the range between 600 nm and 700 nm, such as a He-Ne laser, is used, a stimulable phosphor which emits light having a wavelength within the range between 300 nm and 500 nm should be selected, as disclosed in U.S. Pat. No. 4,258,264.

Further, in order to increase the amount of light read out from the stimulable phosphor and shorten the readout time, it is preferable to use a gas ion laser source emitting a laser beam having a wavelength range shorter than 600 nm, such as an $Ar^{30}$ laser beam (488 nm, 514.5 nm), a $Kr^+$ laser beam (520.9 nm, 530.9 nm, 568.2 nm), or an $Ar^+$-$Kr^+$ laser beam.

As the stimulable phosphor, for example, rare earth activated alkaline earth metal fluorohalide phosphor is preferred. One example of this phosphor is, as shown in DE-OS No. 2,928,245, a phosphor represented by the formula $(Ba_{1-x-y},Mg_x,Ca_y)FK: aEu^{2+}$ wherein X is at least one of Cl and Br, x and y are numbers satisfying $0<x+y\leq0.6$ and $xy\neq0$, and a is a number satisfying $10^{-6}\leq a\leq5\times10^{-2}$. Another example of this phosphor is, as shown in U.S. Pat. No. 4,239,968, a phosphor represented by the formula $(Ba_{1-x}, M^{II}_x)FX: yA$ wherein $M^{II}$ is at least one of Mg, Ca, Sr, Zn and Cd, X is at least one of Cl, Br and I, A is at least one of Eu, Tb, Ce, Tm, Dy, Pr, Ho, Nd, Yb and Er, x is a number satisfying $0\leq x\leq0.6$, and y is a number satisfying $0\leq y\leq0.2$. Further, as the stimulable phosphor to be used in this invention can be used ZnS: Cu,Pb; BaQ.x-$Al_2O_3$: Eu wherein $0.8\leq x\leq10$; and $M^{II}O.xSiO_2$: A wherein $M^{II}$ is Mg, Ca, Sr, Zn, Cd or Ba, A is Ce, Tb, Eu, Tm, Pb, Tl, Bi or Mn, and x is a number satisfying $0.5\leq x\leq2.5$, as shown in U.S. Pat. No. 4,236,078. Furthermore, as the stimulable phosphor can be used LnOX: xA wherein Ln is at least one of La, Y, Gd and Lu, X is at least one of Cl and Br, A is at least one of Ce and Tb, x is a number satisfying $0<x<0.1$, as shown in U.S. Pat. No. 4,236,078. Among the above enumerated phosphors, the rare earth activated alkaline earth metal fluorohalide phosphor is the most preferable, among which barium fluorohalides are the most preferable in view of the high invensity of emission of light.

Further, barium fluorohalide phosphors added with a metal fluoride as disclosed in European Patent Publication No. 21,342, or barium fluorohalide phosphors added with at least one of a metal chloride, a metal bromide and a metal iodide as disclosed in European Patent Publication No. 29,963 are also preferable because of their improved light emitting characteristics. When the composite member for use in the energy subtraction process method for radiation images in accordance with the first aspect of the present invention is manufactured by use of a plurality of stimulable phosphor sheets comprising different kinds of stimulable phosphors exhibiting different levels of characteristics of absorbing the low energy component of a radiation, different kinds of stimulable phosphors exhibiting radiation energy absorbing characteristics different from one another should preferably be selected among the above enumerated phosphors and used for manufacturing the stimulable phosphor sheets.

It is also desirable to color the phosphor layer of the stimulable phosphor sheet made of the above phosphor by use of pigments or dyes to improve the sharpness of the image obtained thereby as disclosed in European Patent Publication No. 21,174.

As for the signal processing conducted before or after the subtraction processing in the energy subtraction processing method for radiation images in accordance with the present invention, it is possible to employ, for example, a frequency processing as disclosed in U.S. Pat. No. 4,315,318 or European Patent Publication No. 31,952, and a gradation processing as disclosed in U.S. Pat. Nos. 4,302,672, 4,276,473 or 4,310,886.

Figure 1:
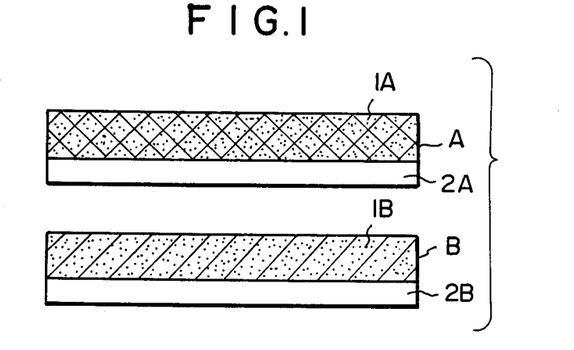
FIG. 1 is a schematic cross-sectional view showing an embodiment of the stimulable phosphor sheet composite member used in the energy subtraction processing method for radiation images in accordance with the present invention.

FIG. 1 schematically shows an embodiment of the stimulable phosphor sheet composite member used in the energy subtraction processing method for radiation images in accordance with the first aspect of the present invention. The stimulable phosphor sheet composite member shown in FIG. 1 comprises stimulable phosphor sheets A and B positioned in the condition overlaid one upon the other. The stimulable phosphor sheet A comprises a substrate 2A made of a material permeable to X-rays, such as polyethylene terephthalate or cellulose acetate, and a stimulable phosphor layer 1A which comprises an appropriate binder and a stimulable phosphor dispersed therein and which is formed on the substrate 2A. Also, the stimulable phosphor sheet B comprises a substrate 2B made of a material permeable to X-rays and a stimulable phosphor layer 1B which comprises an appropriate binder and a stimulable phosphor dispersed therein and which is formed on the substrate 2B. In the stimulable phosphor sheet A, a stimulable phosphor exhibiting a higher level of characteristics of absorbing the low energy component of a radiation than the level of such characteristics of the stimulable phosphor of the stimulable phosphor sheet B is used as the stimulable phosphor of the sheet A, or a material absorbing the low energy component of a radiation is added to and dispersed in the stimulable phosphor layer 1A. Therefore, the stimulable phosphor sheet A exhibits a higher level of characteristics of absorbing the low energy component of a radiation than the level of such characteristics of the stimulable phosphor sheet B. On the surfaces of the stimulable phosphor layers 1A and 1B (i.e. the surfaces thereof on the sides opposite to the substrates 2A and 2B, respectively) of the stimulable phosphor sheets A and B, protective films made of polyethylene terephthalate or the like may be provided for physically and chemically protecting the stimulble phosphor layers 1A and 1B. (Such protective films may be provided also in the stimulable phosphor sheet composite member shown in FIG. 5, the stimulable phosphor sheet-filter composite members shown in FIGS. 6, 7 and 8, and the stimulable phosphor sheet shown in FIG. 9.)

Figure 2:
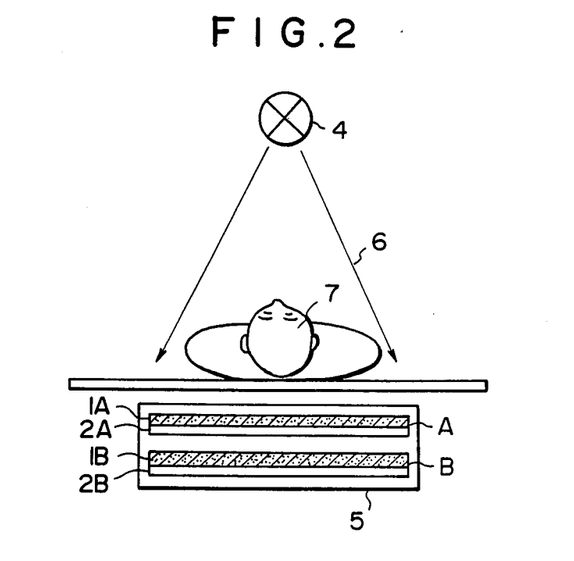
FIG. 2 is an explanatory schematic view showing the condition of recording radiation images of an object in the stimulable phosphor sheets of the composite member shown in FIG. 1 in accordance with the present invention.

FIG. 2 schematically shows the condition of recording radiation images of an object in the stimulable phosphor sheets A and B of the composite member shown in FIG. 1 in the energy subtraction processing method for radiation images in accordance with the first aspect of the present invention. A single X-ray source 4 is positioned for emitting X-rays 6 to an object 7. The stimulable phosphor sheet composite member as shown in FIG. 1 is housed in a cassette 5 and positioned at the back of the object 7.

In FIG. 2, when the X-rays 6 are emitted from the X-ray source 4, the stimulable phosphor sheet A is first exposed to the X-rays 6 passing through the object 7 including a specific structure exhibiting radiation energy absorption characteristics different from the radiation energy absorption characteristics of the other structures, and an X-ray image of the object 7 is stored in the stimulable phosphor sheet A. Since the stimulable phosphor sheet A exhibits a higher level of characteristics of absorbing the low energy component of the radiation, the amount of the low energy component in the X-rays 6 becomes smaller and the high energy component becomes enhanced in the X-rays 6 after the X-rays 6 pass through the stimulable phosphor sheet A. Then, the stimulable phosphor sheet B is exposed to the X-rays 6 passing through the stimulable phosphor sheet A, and an X-ray image of the object 7 wherein the image information concerning the low energy component of the radiation is reduced is stored in the stimulable phosphor sheet B. In this manner, two X-ray images between which the image information at the portion corresponding to the specific structure of the object 7 is different are simultaneously stored in the stimulable phosphor sheets A and B.

Figure 3:
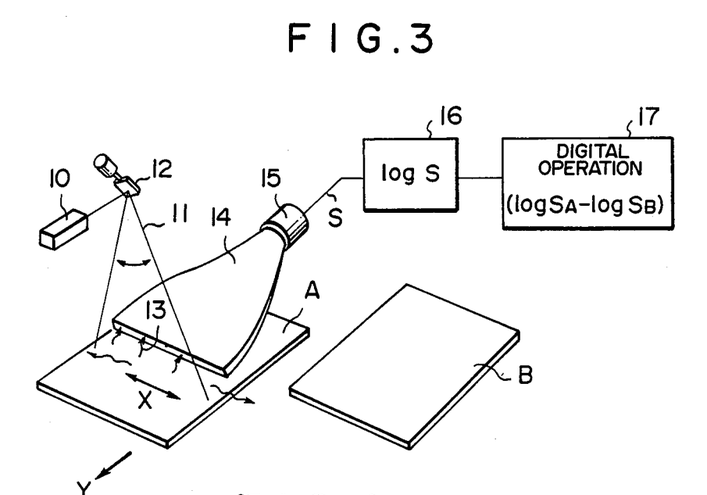
FIG. 3 is a schematic view showing the step of causing each of the stimulable phosphor sheets of the composite member shown in FIG. 2 to emit light upon stimulation thereof in proportion to the radiation energy stored therein, photoelectrically converting the emitted light to obtain digital signals, and conducting the subtraction processing of the digital signals.

From the stimulable phosphor sheets A and B carrying the X-ray images stored therein, the X-ray images are read out by use of the read-out system as shown in FIG. 3 to obtain digital image signals representing the X-ray images. First, while the stimulable phosphor sheet A is moved in the direction of the arrow Y to conduct sub-scanning, a laser beam 11 emitted from a laser source 10 is deflected in the direction of the arrow X by a scanning mirror 12 to conduct main scanning. In this manner, the stimulable phosphor sheet A is caused to sequentially release the X-ray energy stored therein as light 13 in proportion to the X-ray energy. The emitted light 13 enters the interior of a light collecting sheet 14, which is made by forming a transparent acrylic sheet, from one end face thereof. The light collecting sheet 14 may be of a shape and a material as disclosed in U.S. Pat. No. 4,346,295, DE-OS No. 2,951,501 or European Patent Publication No. 32,521. The light 13 is then transferred to a photomultiplier 15 through total reflection in the interior of the light collecting sheet 14, and the amount of the light 13 is outputted from the photomultiplier 15 as an image signal S. The image signal S is then converted to a digital image signal $\log S_A$ of a logarithmic value (logS) by a log-converter 16 comprising an amplifier and an A/D converter. The digital image signal $\log S_A$ is entered into a digital operation unit 17 and stored therein. Thereafter, the X-ray image stored in the other stimulable phosphor sheet B is read out therefrom in exactly the same manner as described above, and a digital image signal $\log S_B$ thus obtained is stored in the digital operation unit 17. In the digital operation unit 17, the difference between the digital image signals $\log S_A$ and $\log S_B$ is calculated for each corresponding picture element, and an image signal of the specific structure to be extracted is obtained. At this time, each of the digital image signals $\log S_A$ and $\log S_B$ is multiplied by an appropriate weight factor. The weight factors should preferably be selected so that the gradation at the portion to be erased becomes identical between the two images. As described above, the digital image signals are converted to and handled as logarithmic values. This is because band compression of the image signal values is thereby achieved, and complete removal of unnecessary image information becomes possible. However, it is also possible to carry out the same operation by using the original image signal values without converting them to logarithmic values.

The signal obtained by conducting the digital subtraction processing as described above is subjected to various image processings such as a processing of frequency response, a gradation processing, an arithmetic averaging processing and the like when necessary, and used for directly reproducing a visible image on a display device such as a CRT or for reproducing a visible image in a recording material such as a light-sensitive film as described below.

Figure 4:
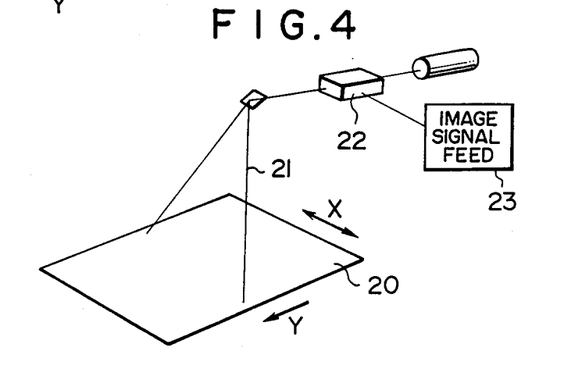
FIG. 4 is a schematic view showing the step of reproducing a subtraction processed image in a light-sensitive film by use of the signal obtained by the subtraction processing.

By way of example, FIG. 4 shows the step of reproducing a visible radiation image in a recording material by the point-by-point scanning. In FIG. 4, a light-sensitive film 20 is moved in the sub-scanning direction indicated by the arrow Y, and at the same time a laser beam 21 is deflected onto the light-sensitive film 20 in the main scanning direction indicated by the arrow X. The laser beam 21 is modulated by an A/O modulator 22 with an image signal sent from an image signal feeder 23, thereby to form a visible image in the light-sensitive film 20. By using the output of the aforesaid digital operation unit 17 as the image signal sent from the image signal feeder 23, it becomes possible to reproduce a visible image of a desired specific structure obtained by the digital subtraction processing in the light-sensitive film 20.

Figure 5:
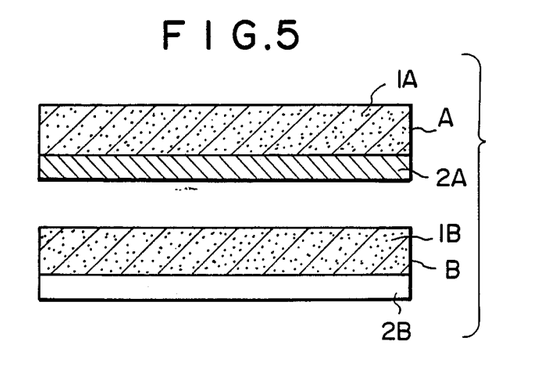
FIGS. 5 to 8 are schematic cross-sectional views showing various embodiments of the composite members comprising stimulable phosphor sheets used in the method of the present invention.
Figure 6:
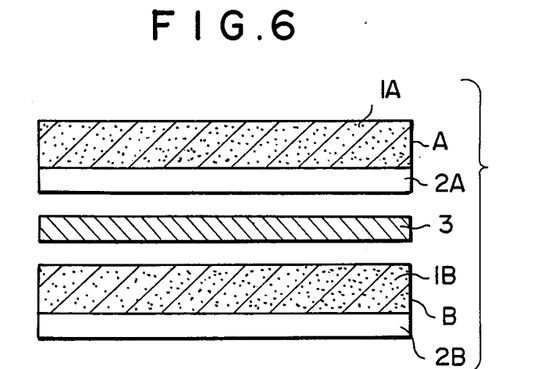
Figure 7:
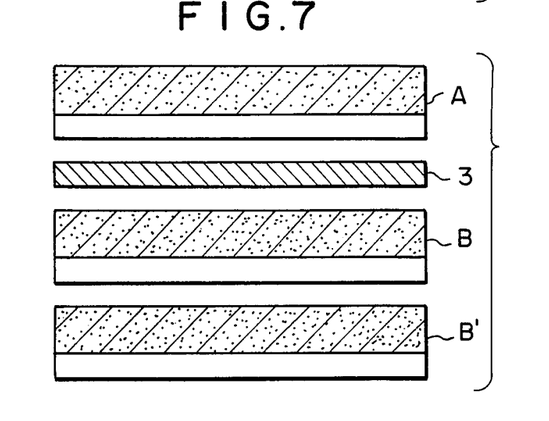
Figure 8:
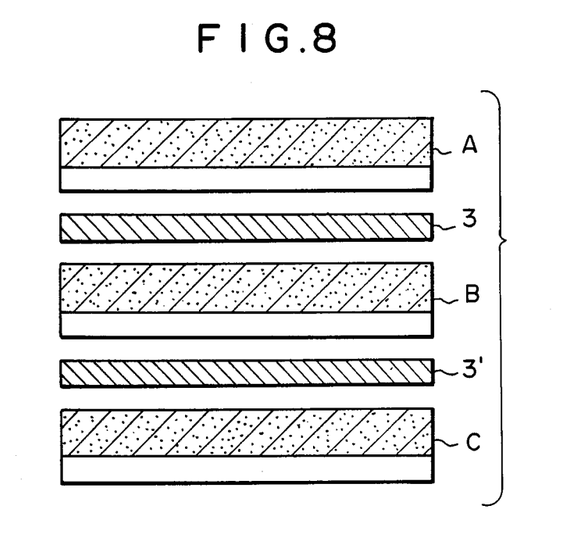
Figure 9:
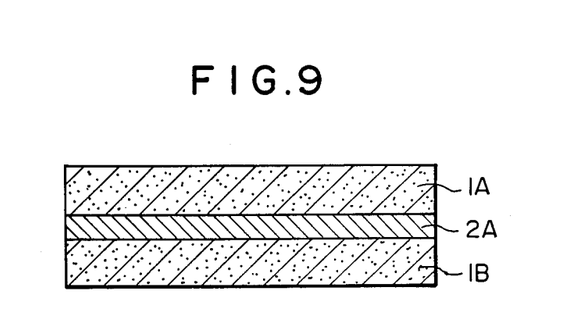
FIG. 9 is a schematic cross-sectional view showing an embodiment of the stimulable phosphor sheet provided with two stimulable phosphor layers, which is used in the method of the present invention.

Also when the energy subtraction processing method for radiation images in accordance with the present invention is carried out by use of the stimulable phosphor sheet composite member as shown in FIG. 5, the stimulable phosphor sheet-filter composite members as shown in FIGS. 6, 7 and 8, or the stimulable phosphor sheet as shown in FIG. 9, the subtraction processing is conducted in the same manner as described above.

FIG. 5 schematically shows another embodiment of the stimulable phosphor sheet composite member used in the energy subtraction processing method for radiation images in accordance with the first aspect of the present invention. In this embodiment, a substrate 2A of a stimulable phosphor sheet A positioned closer to the object is made of a material absorbing the low energy component of a radiation. The low energy component of the radiation passing through the object is absorbed by the substrate 2A. The substrate 2A may be composed only of a material absorbing the low energy component of a radiation, or may be composed of a material absorbing the low energy component of a radiation and another material for containing the material absorbing the low energy component of a radiation in the condition dispersed therein.

FIG. 6 schematically shows an embodiment of the stimulable phosphor sheet-filter composite member used in the energy subtraction processing method for radiation images in accordance with the second aspect of the present invention. The stimulable phosphor sheet-filter composite member comprises stimulable phosphor sheets A and B positioned in the condition overlaid one upon the other (each sheet comprises a substrate and a stimulable phosphor layer formed thereon), and a filter 3 interposed therebetween. The filter 3 may be composed only of a material absorbing the low energy component of a radiation, or may be composed of a material absorbing the low energy component of a radiation and another material for containing the material absrobing the low energy component of a radiation in the condition dispersed therein. The low energy component of the radiation passing through the object is absorbed by the filter 3.

FIG. 7 schematically shows another embodiment of the stimulable phosphor sheet-filter composite member used in the energy subtraction processing method for radiation images in accordance with the second aspect of the present invention. The stimulable phosphor sheet-filter composite member of this embodiment comprises stimulable phosphor sheets A, B and B' positioned in the condition overlaid one upon another (each sheet comprises a substrate and a stimulable phosphor layer formed thereon), and a filter 3 made of a material absorbing the low energy component of a radiation and interposed between the sheet A positioned closest to the object and the middle sheet B. When a subtraction image is obtained by use of the stimulable phosphor sheet-filter composite member composed as described above, the composite member is first exposed to a radiation passing through the object, and then radiation images stored in the sheets A, B and B' are read out therefrom as described above. Based on the radiation images obtained from the sheets B and B', a radiation image to be subtraction processed is obtained by superposition processing. On the other hand, the radiation image obtained from the sheet A is directly used as another radiation image to be subtraction processed. The subtraction processing is conducted as described above between the thus obtained radiation images to be subtraction processed.

FIG. 8 schematically shows a further embodiment of the stimulable phosphor sheet-filter composite member used in the energy subtraction processing method for radiation images in accordance with the second aspect of the present invention. This embodiment comprises stimulable phosphor sheets A, B and C positioned in the condition overlaid one upon another (each sheet comprises a substrate and a stimulable phosphor layer formed thereon), and filters 3 and 3' made of a material absorbing the low energy component of a radiation and interposed among the sheets A, B and C. The filter 3 is interposed between the sheets A and B, and the filter 3' is interposed between the sheets B and C. When a subtraction image is obtained by use of the stimulable phosphor sheet-filter composite member, the composite member is exposed to a radiation passing through the object, and then the subtraction processing is conducted among the radiation images obtained from the stimulable phosphor sheets A, B and C.

FIG. 9 schematically shows an embodiment of the stimulable phosphor sheet used in the energy subtraction processing method for radiation images in accordance with the third aspect of the present invention. The stimulable phosphor sheet of this embodiment comprises a substrate 2A made of a material absorbing the low energy component of a radiation, and stimulable phosphor layers 1A and 1B provided on opposite surfaces of the substrate 2A. Since the radiation images (i.e. the radiation images to be subtraction processed) stored in the stimulable phosphor layers 1A and 1B are in mirror image relation to each other, one or the other of the radiation images should be inverted when the subtraction processing is carried out. The substrate 2A may be composed only of a material absorbing the low energy component of a radiation, or may be composed of a material absorbing the low energy component of a radiation and another material for containing the material absorbing the low energy component of a radiation in the condition dispersed therein.

In the stimulable phosphor sheet composite member as shown in FIG. 1, and the stimulable phosphor sheet-filter composite members as shown in FIGS. 6, 7 and 8, the stimulable phosphor sheets constituting each composite member may be replaced by self-supporting stimulable phosphor sheets provided with no substrates.

We claim:

1. An energy subtraction processing method for radiation images comprising the steps of:
   (i) exposing an object including a specific structure exhibiting radiation energy absorption characteristics different from the radiation energy absorption characteristics of the other structures to a radiation,
   (ii) simultaneously exposing substantially the entire area of two stimulable phosphor sheets positioned in the condition overlaid one upon another in a composite member to the radiation passing through said object to have radiation images stored in the respective stimulable phosphor sheets so that image information containing, at the portion corresponding to said specific structure, the low energy component of the radiation in an amount smaller than the amount contained in the image information recorded in a stimulable phosphor sheet positioned closer to said object is recorded in a stimulable phosphor sheet positioned farther from said object, said stimulable phosphor sheets exhibiting different levels of characteristics of absorbing the low energy component of a radiation, said stimulable phosphor sheets being positioned in such a manner that a stimulable phosphor sheet exhibiting a higher level of characteristics of absorbing the low energy component of a radiation is closer to the object that a stimulable phosphor sheet exhibiting a lower level of said characteristics, a material absorbing the low energy component of a radiation being dispersed in the stimulable phosphor layer of the stimulable phosphor sheet positioned closer to the object, whereby the level of characteristics of absorbing the low energy component of a radiation of the stimulable phosphor sheet positioned closer to the object is made higher than a level of the characteristics of the stimulable phosphor sheet positioned farther from the object,
   (iii) scanning the respective stimulable phosphor sheets with stimulating rays to sequentially release the radiation energy stored in the stimulable phosphor sheets as light emission,
   (iv) photoelectrically detecting the emitted light and converting it to digital image signals of the respective radiation images,
   (v) on the basis of said radiation images converted to said digital image signals, obtaining at least two radiation images to be subtraction processed, and
   (vi) extracting an image of said specific structure by conducting a subtraction processing of said digital image signals between the corresponding picture elements of said at least two radiation images to be subtraction processed.

2. An energy subtraction processing method as claimed in claim 1, wherein said composite member consists only of two stimulable phosphor sheets.

3. An energy subtraction processing method for radiation images comprising the steps of:
   (i) exposing an object including a specific structure exhibiting radiation energy absorption characteristics different from the radiation energy absorption characteristics of the other structures to a radiation,
   (ii) simultaneously exposing substantially the entire area of two stimulable sheets positioned in the condition overlaid one upon another in a composite member to the radiation passing through said object to have radiation images stored in the respective stimulable sheets so that image information containing, at the portion corresponding to said specific structure, the low energy component of the radiation in an amount smaller than the amount contained in the image information recorded in a stimulable phosphor sheet positioned closer to said object is recorded in a stimulable phosphor sheet positioned farther from said object, said stimulable phosphor sheets exhibiting different levels of characteristics of absorbing the low energy component of a radiation, said stimulable phosphor sheets being positioned in such a manner that a stimulable phosphor sheet exhibiting a higher level of characteristics of absorbing the low energy component of a radiation is closer to the object than a stimulable phosphor sheet exhibiting a lower level of said characteristics, the stimulable phosphor sheet positioned closer to the object comprising a substrate and a stimulable phosphor layer provided thereon, said substrate being made of a material absorbing the low energy component of a radiation, whereby the level of characteristics of absorbing the low energy component of a radiation of the stimulable phosphor sheet positioned closer to the object is made higher than the level of said characteristics of the stimulable phosphor sheet positioned farther from the object,
   (iii) scanning the respective stimulable phosphor sheets with stimulating rays to sequentially release the radiation energy stored in the stimulable phosphor sheets as light emission,
   (iv) photoelectrically detecting the emitted light and converting it to digital image signals of the respective radiation images,
   (v) on the basis of said radiation images converted to said digital image signals, obtaining at least two radiation images to be subtraction processed, and
   (vi) extracting an image of said specific structure by conducting a subtraction processing of said digital image signals between the corresponding picture elements of said at least two radiation images to be subtraction processed.

4. A method as defined in claim 3 wherein said substrate is composed of said material absorbing the low energy component of a radiation, and another material for containing said material absorbing the low energy component of a radiation in the condition dispersed therein.

5. A method as defined in claim 3 wherein said substrate is composed only of said material absorbing the low energy component of a radiation.

6. A method as defined in claim 3 wherein said material absorbing the low energy component of a radiation is a metal.

7. A method as defined in claim 6 wherein said metal is at least one of Cu, W, Mo, Ni, Pb, Au, Ag, Ba, Ta, Fe, Al, Zn, Cd, Ti, Zr, V, Nb, Cr, Co, and Sn.

8. An energy subtraction processing method for radiation images comprising the steps of:
 (i) exposing an object including a specific structure exhibiting radiation energy absorption characteristics different from the radiation energy absorption characteristics of the other structures to a radiation,
 (ii) exposing substantially the entire area of a stimulable phosphor sheet comprising:
  (a) a substrate made of a material absorbing the low energy component of the radiation, and
  (b) two stimulable phosphor layers formed on opposite surfaces of said substrate,
 to the radiation passing through said object to have radiation images stored in the respective stimulable phosphor layers so that image information containing, at the portiin corresponding to said specific structure, the low energy component of the radiation in an amount smaller than the amount contained in the image information recorded in the stimulable phosphor layer formed on the object side surface of said substrate of said stimulable phosphor sheet is recorded in the stimulable phosphor layer formed on the substrate surface opposite to said object,
 (iii) scanning the respective stimulable phosphor layers with stimulating rays to sequentially release the radiation energy stored in the stimulable phosphor layers as light emission,
 (iv) photoelectrically detecting the emitted light and converting it to digital image signals of the respective radiation images, and
 (v) extracting an image of said specific structure by conducting a subtraction processing of said digital image signals between the corresponding picture elements of the two radiation images converted to said digital image signals.

9. An energy subtraction processing method for radiation images comprising the steps of:
 (i) exposing an object including a specific structure exhibiting radiation energy absorption characteristics different from the radiation energy absorption characteristics of the other structures to a radiation,
 (ii) exposing substantially the entire area of a stimulable phosphor sheet, comprising a substrate made of a material absorbing the low energy component of th radiation and two stimulable phosphor layers formed on opposite surfaces of said substrate, to the radiation passing through said object to have radiation images stored in the respective stimulable phosphor layers so that image information containing, at the portion corresponding to said specific structure, the low energy component of the radiation in an amount smaller than the amount contained in the image information recorded in the stimulable phosphor layer formed on the object side surface of said substrate of said stimulable phosphor sheet is recorded in the stimulable phosphor layer formed on the substrate surface opposite to said object, said substrate being composed of said material absorbing the low energy component of a radiation and another material for containing said material absorbing the low energy component of a radiation in the condition dispersed therein,
 (iii) scanning the respective stimulable phosphor layers with stimulating rays to sequentially release the radiation energy stored in the stimulable phosphor layers as light emission,
 (iv) photoelectrically detecting the emitted light and converting it to digital image signals of the respective radiation images, and
 (v) extracting an image of said specific structure by conducting a subtraction processing of said digital image signals between the corresponding picture elements of the two radiation images converted to said digital image signals.

10. A method as defined in claim 9 wherein said material absorbing the low energy component of a radiation is a metal.

11. A method as defined in claim 10 wherein said metal is at least one of Cu, W, Mo, Ni, Pb, Au, Ag, Ba, Ta, Fe, Al, Zn, Cd, Ti, Zr, V, Nb, Cr, Co, and Sn.

12. An energy subtraction processing method for radiation images comprising the steps of:
 (i) exposing an object including a specific structure exhibiting radiation energy absorption characteristics different from the radiation energy absorption characteristics of the other structures to a radiation,
 (ii) exposing substantially the entire area of a stimulable phosphor sheet, comprising a substrate consisting of a material absorbing the low energy component of the radiation and two stimulable phosphor layers formed on opposite surfaces of said substrate, to the radiation passing through said object to have radiation images stored in the respective stimulable phosphor layers so that image information containing, at the portion corresponding to said specific structure, the low energy component of the radiation in an amount smaller than the amount contained in the image information recorded in the stimulable phosphor layer formed on the object side surface of said substrate of said stimulable phosphor sheet is recorded in the stimulable phosphor layer formed on the substrate surface opposite to said object,
 (iii) scanning the respective stimulable phosphor layers with stimulating rays to sequentially release the radiation energy stored in the stimulable phosphor layers as light emission,
 (iv) photoelectrically detecting the emitted light and converting it to digital image signals of the respective radiation images, and
 (v) extracting an image of said specific structure by conducting a subtraction processing of said digital image signals between the corresponding picture elements of the two radiation images converted to said digital image signals.

13. A composite member as defined in claim 12 wherein a material absorbing the low energy component of a radiation is dispersed in the stimulable phosphor layer of one or the other of said two stimulable phosphor sheets, whereby the levels of said characteristics of said two stimulable phosphor sheets are made different from each other.

14. A composite member as defined in claim 12 wherein one or the other of said two stimulable phosphor sheets comprises a substrate and a stimulable phosphor layer provided thereon, and said substrate is made of a material absorbing the low energy component of a radiation, whereby the levels of said characteristics of said two stimulable phosphor sheets are made different from each other.

15. A composite member as defined in claim 14 wherein said substrate is composed of said material absorbing the low energy component of a radiation, and another material for containing said material absorbing the low energy component of a radiation in the condition dispersed therein.

16. A composite member as defined in claim 14 wherein said substrate is composed only of said material absorbing the low energy component of a radiation.

17. A composite member as defined in claim 13 wherein said material absorbing the low energy component of a radiation is a metal.

18. A composite member as defined in claim 17 wherein said metal is at least one of Cu, W, Mo, Ni, Pb, Au, Ag, Ba, Ta, Fe, Al, Zn, Cd, Ti, Zr, V, Nb, Cr, Co and Sn.

19. A stimulable phosphor sheet for use in an energy subtraction processing method for radiation images, which comprises:
    (a) a substrate made of a material absorbing the low energy component of a radiation, and
    (b) stimulable phosphor layers formed on both surfaces of said substrate.

20. A stimulable phosphor sheet as defined in claim 19 wherein said substrate is composed of said material absorbing the low energy component of a radiation, and another material for containing said material absorbing the low energy component of a radiation in the condition dispersed therein.

21. A stimulable phosphor sheet as defined in claim 19 wherein said substrate is composed only of said material absorbing the low energy component of a radiation.

22. A stimulable phosphor sheet as defined in claim 19 wherein said material absorbing the low energy component of a radiation is a metal.

23. A stimulable phosphor sheet as defined in claim 22 wherein said metal is at least one of Cu, W, Mo, Ni, Pb, Au, Ag, Ba, Ta, Fe, Al, Zn, Cd, Ti, Zr, V, Nb, Cr, Co and Sn.

* * * * *